United States Patent [19]

DeVlieg

[11] 4,076,331
[45] Feb. 28, 1978

[54] AIRCRAFT AUTOMATIC BRAKING SYSTEM

[75] Inventor: Garrett Howard DeVlieg, Bellevue, Wash.

[73] Assignee: The Boeing Company, Seattle, Wash.

[21] Appl. No.: 725,610

[22] Filed: Sep. 22, 1976

Related U.S. Application Data

[60] Continuation-in-part of Ser. No. 632,113, Nov. 14, 1975, abandoned, which is a continuation-in-part of Ser. No. 477,244, Jun. 7, 1974, Pat. No. 3,920,282, which is a division of Ser. No. 394,890, Sep. 6, 1973, Pat. No. 3,917,356.

[51] Int. Cl.² ............................................. B60T 8/02
[52] U.S. Cl. ........................................ 303/93; 244/111
[58] Field of Search ................... 188/181 A; 244/111; 303/20, 93, 97, 100, 101, 103, 105, 106

[56] References Cited

U.S. PATENT DOCUMENTS

3,856,365  12/1974  Steigerwald et al. ........... 244/111 X

Primary Examiner—Stephen G. Kunin
Attorney, Agent, or Firm—Conrad O. Gardner; Bernard A. Donahue

[57] ABSTRACT

An aircraft automatic braking system is provided having deceleration selecting apparatus which is responsive to nose wheel contact with the runway surface. The system applies a lesser deceleration level than commanded by the pilot while the nose wheels are in the air and switches to the pilot selected deceleration level upon nose wheel contact with the runway thereby preventing hard nose gear touchdown due to automatic braking pressure application prior to nose wheel touchdown.

3 Claims, 9 Drawing Figures

AIRCRAFT AUTOMATIC BRAKING SYSTEM

This application is a continuation-in-part of my application Ser. No. 632,113 filed Nov. 14, 1975 now abandoned which is a continuation-in-part of my application Ser. No. 477,244 filed June 7, 1974, now U.S. Pat. No. 3,920,282 which is a divisional of my application Ser. No. 394,890 filed Sept. 6, 1973, now U.S. Pat. No. 3,917,356.

This invention relates to automatic braking systems for aircraft and more particularly to an automatic braking system for processing wheelspeed signals from the front wheels of landing gear trucks for providing system energization while utilizing signals representative of deceleration developed from aft wheels of the trucks. The system utilizes a single control valve which meters braking pressure to the shuttle valves (one for each side of the aircraft). The pressure is then passed through the shuttle valve to the metered brake pressure line. The single control valve assures equal braking on all wheels, and the two shuttle valves permit the pilot to instantly override automatic braking at all times. Normal anti-skid control is retained and hydraulic pressure modulation rates are controlled so that smooth braking is realized and anti-skid efficiency optimized. An orifice in the automatic braking system hydraulic return line is sized to assure smooth release of automatic braking not dependent upon electrically generated off ramp control signal generating circuits as shown in the system of application Ser. No. 200,092 filed Nov. 18, 1971, now abandoned, by Glasenapp et al. which application is assigned to the assignee of the present application. The present automatic braking system further permits braking only when the system control logic is satisfied.

The importance of avoiding possible runway overrun by prompt brake application after touchdown has been recognized earlier in the aforementioned patent application wherein an automatic braking system for reducing the probability of such incidents occurring was provided by automatically applying wheel braking and decelerating the aircraft at a predetermined rate of deceleration.

The feature of the present system is the utilization of the average of a plurality of forward wheels on aircraft landing gear trucks to provide logic information signals to the system control logic circuits which provide the turn on the turn off logic for the automatic braking system. D.C. wheelspeed signals developed for anti-skid circuit control are processed to provide turn on logic and also processed to provide pressure control in the control channel.

The present system provides means for averaging a plurality of wheelspeed signals developed from transducers on a respective plurality of rear wheels of the landing gear trucks with subsequent signal processing including differentiation, filtering and limiting to provide signals which are then compared to signals representative of selected deceleration to provide an initial commanded deceleration rate at least several times the selected rate of deceleration (e.g., 5 times) with consequent decay in commanded deceleration rate to the selected valve in a predetermined time period e.g., one-third second. The error signal is subsequently limited to (nominally) plus or minus 500 psi per second, then coupled through integrator and limiter circuit means further limiting to (nominally) 1,800 and 300 psi. The brake pressure control signal thus developed in the control channel is then coupled to power amplifier means and the amplified brake pressure control signal is then coupled to the automatic brake pressure modulating valve means.

The valve means in accordance with an embodiment of the invention is mounted in valve module with an upstream solenoid shutoff valve and two pressure switches. The valve means meters the automatic braking pressure to tow shuttle valves, one for the brake on the respective sides of the aircraft. The pressure is transmitted through the shuttle valves and the anti-skid valves to the brakes, unless the pilot's metered pressure exceeds and overrides the auto-brake pressure at the shuttle valve. To avoid degrading of anti-skid braking efficiency and to further insure smooth braking, the aforementioned rate limits (plus or minus 500 psi/sec nominal) are provided to prevent rapid pressure variations and the final auto-brake shutoff. A further important feature of the present automatic braking system is the arrangement of an orifice in the auto-brake valve module return line to cause auto-brake (automatic braking) pressure to be released smoothly and rapidly when shut off.

The automatic braking system in the aforementioned application to Glasenapp et al. requires that auto-brakes must be both hydraulically and electrically disconnected to permit manual braking override. Also two pressure comparators (hydraulic differential pressure switches) are added, in addition to the two switches per brake pedal, to sense the pilot's metered pressure equals braking pressure then shutting off the auto-brakes. In the Glasenapp et al. system, some passenger jolt occurs during transition from automatic to manual braking since when one side of the aircraft senses transition by the pressure comparator then both side of the aircraft lose auto-brakes.

The above mentioned disadvantages of the Glasenapp et al. system are overcome in the present system in which automatic braking pressure is regulated by the pressure control valve in the auto-brake module. This pressure is transmitted through one shuttle valve on each side of the aircraft and into the metered pressure line. Metered pressure switches may be utilized to replace the switches on the pilot's pedals. The auto-brake valve module may according to an embodiment of the present system include in series path a solenoid valve, a pressure switch, a pressure control valve, and a further pressure switch. The solenoid valve turns hydraulic power on in the auto-brake system, and the pressure control valve in the series path regulates auto-brake pressure. Pressure switches for logic detection of critical failures may be included in the series path. The present system utilizes less components than the aforementioned Glasenapp system and provides simplified and improved auto-brake control.

Accordingly the object of the present invention are to provide an automatic braking system having the following features or advantages:

1. Provision for manual braking override of auto-braking even if the auto-brakes remain in the on condition both electrically and/or hydraulically.

2. A system design not requiring the utilization of pressure comparators.

3. The assurance of substantially equal braking on all wheels, independent of anti-skid valve tolerances or valve calibration drift.

4. Minimization of passenger jolt during auto-to-manual reversion of each side of the aircraft separately.

5. Exclusion of anti-skid control commands from the auto-brake command control path.

6. Elimination of electrical failures as a cause of assymetric braking.

7. Prevention of degradation of anti-skid braking efficiency during auto-braking.

A further feature of the present invention is the utilization of a deceleration overshoot command to insure pilot feel of braking at touchdown.

Yet a further feature of the present system comprises the utilization of limiting circuit means in the automatic brake pressure control signal channel for limiting the rate of change of auto-brake pressure command to (nominally plus or minus 500 psi/sec) give smooth brake modulation.

Another feature of the present system comprises the averaging of a plurality of rear truck wheel D.C. level wheelspeed signals (such as those developed for and utilized in anti-skid signal processing) for development of signals representative of deceleration and the utilization of front truck wheel D.C. level wheelspeed signals for coupling to spin-up detection logic to insure that the deceleration measuring rear wheel signals are fully spun up by the time the spin-up detecting wheels pass the spin-up detection threshold.

A further feature of the present system comprises means for commanding a lesser deceleration level than selected by the pilot prior to nose wheel touchdown and provides for switching to the level selected by the pilot as soon as the nose wheels contact the runway thereby preventing hard nose gear touchdown due to automatic braking pressure application prior to nose gear touchdown.

Preferred embodiments of the present invention are described and illustrated in the attached drawings, wherein.

Figure 1:
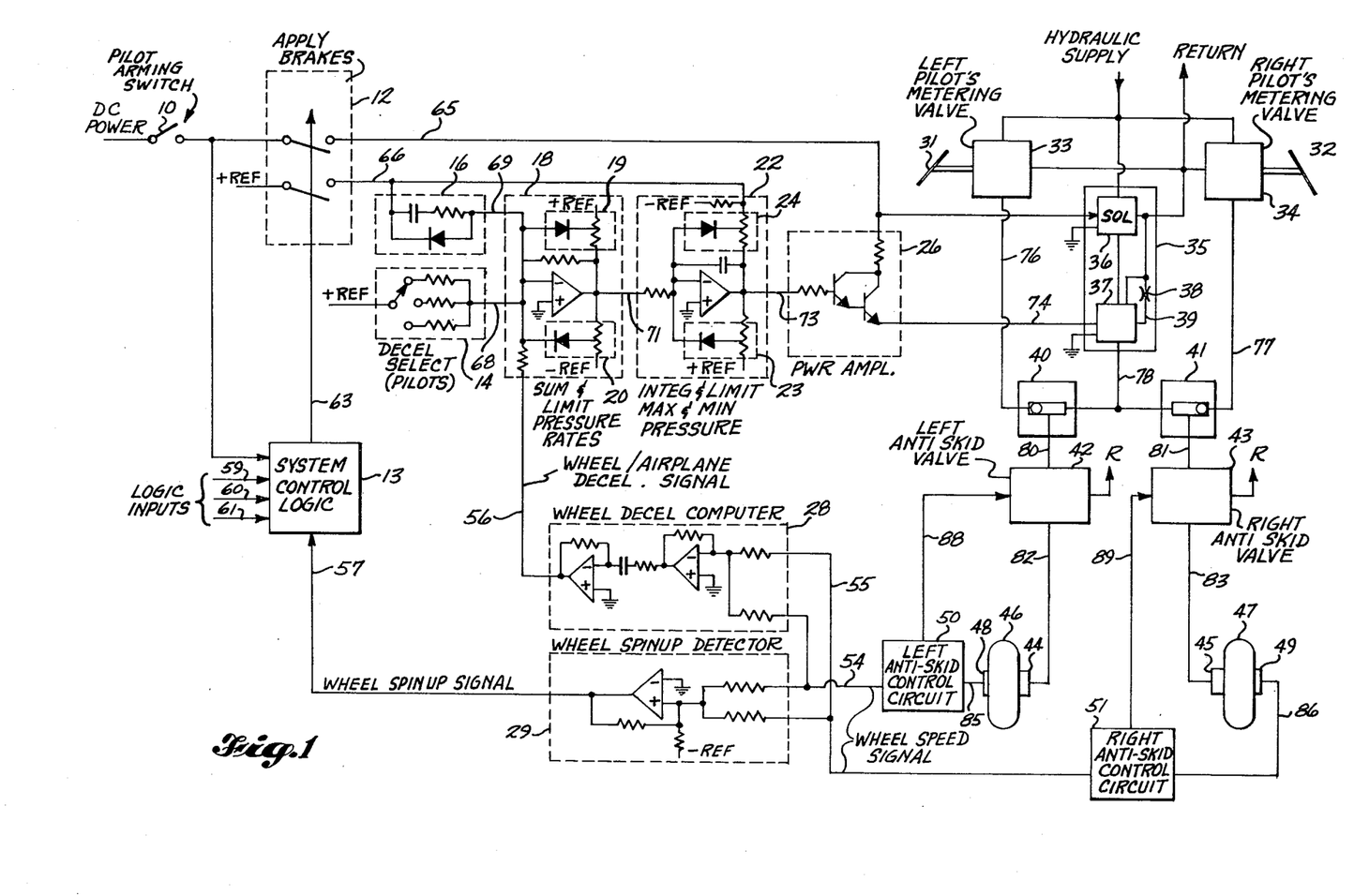
FIG. 1 is a schematic diagram of a preferred embodiment of an aircraft automatic braking system showing signal processing for developing brake pressure control signals, amplification thereof and an exemplary hydraulic system coupled thereto for purposes of illustration of a complete system.

Turning now to the automatic braking system of FIG. 1, it will be noted that the pilot prepares the present control system for automatic braking prior to landing by closing the pilot arming switch 10 thereby supplying D.C. power to system logic control circuit means 13 and also by rotating deceleration level selecting switch means 14 to the deceleration level desired. Upon selection of a desired deceleration level, a pilot's deceleration command signal 68 is generated through the coupling of a positive reference potential to one of a plurality of calibrated resistors shown in deceleration level selecting switch means 14. The deceleration command signal 68 is coupled to the deceleration error signal computing and amplitude limiting circuit means 18 thereby setting the deceleration braking level commanded by the system subsequent to aircraft touchdown.

Upon subsequent touchdown of the aircraft which includes in the embodiment of FIG. 1 a hydraulic system coupled for purposes of illustration to a single main gear wheel disposed on each side of the aircraft, left and right wheelspeed signals 54 and 55 are obtained from the respective left and right anti-skid control circuit means 50 and 51 which develop and itilize such signals in a known manner. These left and right wheel-speed signals 54 and 55 are both coupled respectively to wheelspeed deceleration signal generating circuit means 28 and wheelspeed spin-up detector circuit means 29. In the circuit embodiment of FIG. 1, wheelspeed deceleration signal generating circuit means 28 averages left and right wheelspeed signals 54 and 55 and further differentiates the average of the wheelspeeds and further filters out high frequency perturbations to provide a wheel-aircraft deceleration signal 56 representative of the average deceleration of left and right wheels 46 and 47. Wheelspeed spin-up detector circuit means 29 in this circuit embodiment average left and right wheelspeed signals 54 and 55 and further compares the average signal to a predetermined wheelspeed spin-up level thereby acting as a switching means to provide a wheelspeed spin-up signal 57 having a negative potential level prior to predetermined wheel-speed spin-up level detection and having a positive reference potential subsequent to detection of the predetermined wheelspeed spin-in level.

Turning now to system logic control circuit means 13, it will be noted that a system logic control signal 63 is developed at the output of system logic control circuit means 13 which is coupled to system logic controlled switching means 12. In the presence of a plurality of logic signals 59, 60, and 61 representative respectively of a plurality of aircraft operating parameters and wheelspeed spin-up signal 57, system logic control signal 63 actuates system logic controlled switching means 12 thereby coupling brake application enabling power 65 to hydraulic power shutoff valve means 36 of automatic braking control valve means 35 causing opening of shutoff valve means 36. Upon opening of shutoff valve means 36, hydraulic power is transmitted to automatic braking pressure modulation valve means 37, and now brake pressure control signal power amplifier 26 which couples automatic braking pressure regulating power 74 to automatic braking pressure modulating valve means 37 can provide automatic braking pressure 78 at the output of automatic braking control valve means 35. System logic control circuit means 13 comprises e.g. an AND circuit which provides system logic control signal 63 when logic input signal 59 representative of the output of the aircraft "Air/Ground Mode" switch signal, absence of advance of throttle representative logic input signal 60, logic input 61 representative of absence of a pilot's brake pedal application, and wheel-speed spin-up signal 57 are all present. Upon actuation of system logic controlled switching means 12 by system logic control signal 63, deceleration control circuit enabling signal 66 comprising a D.C. level reference potential is coupled to initial aircraft deceleration overshoot command signal circuit generating means 16 and further coupled to maximum brake pressure control signal limiting circuit means 24 portion of deceleration error signal integrating and pressure control signal limiting circuit means 22 thereby permitting circuit means 22 to modulate brake pressure control signal 73 from an initial value as set by minimum brake pressure control signal limiting means 24 to a subsequent value in the control channel necessary to maintain the aircraft deceleration rate selected by the pilot and as commanded by the initial aircraft deceleration overshoot command signal circuit generating means 16.

After automatic braking has been initiated, the aircraft deceleration error signal generating and amplitude limiting circuit means 18 adds the initial aircraft deceleration overshoot command signal 69 to the previously selected pilot's deceleration command signal 68, the sum of which comprises the net aircraft deceleration command, and further subtracts from that sum the wheel/aircraft deceleration signal 56 to generate an aircraft deceleration error signal 71 which is representative of the magnitude and polarity of the difference between the commanded and actual deceleration level, and further limits the aircraft deceleration error signal 71 to maximum positive and negative values with the deceleration error limiting circuit means 19 and 20, respectively. The aircraft deceleration error signal 71 is then coupled to the deceleration error signal integrating the pressure control signal limiting circuit means 22 which integrates this signal to generate a brake pressure control signal 73, and further limits the brake pressure control signal 73 to predetermined maximum and minimum values with the maximum and minimum brake pressure control signal limiting circuit means 23 and 24, respectively. The brake pressure control signal is then coupled to the brake pressure control signal power amplifier means 26 which generates the automatic braking pressure regulating power 74 representative of the brake pressure control signal 73, and the automatic braking pressure regulating power 74 is then coupled to the brake pressure control valve 37 portion of automatic braking control valve means 35 which generates an automatic braking pressure 78 which is representative of the automatic braking pressure regulating power 74 and thereby representative of the brake pressure control signal 73. It can now be seen that since the automatic braking pressure 78 is representative of the brake pressure control signal 73 and since the maximum and minimum brake pressure control signal limiting circuit means 23 and 24 portion of the deceleration error signal integrating and pressure control signal limiting circuit means 22 limits the maximum and minimum values of the brakes pressure control signal 73, then the maximum and minimum brake pressure control signal limiting circuit means 23 and 24, respectively, can be set and adjusted to limit the maximum and minimum values respectively which the automatic braking pressure 78 can obtain during automatic braking. Also, it can be now seen that since the brake pressure control signal 73 is the integral of the airplane deceleration error signal 71, then the amplitude and polarity of the airplane deceleration error signal 71 is representative of the positive or negative rate of change of the brake pressure control signal 73 and consequently the positive and negative rate of change of the automatic braking pressure 78. Therefore, the deceleration error limiting circuit means 19 and 20 portions of the airplane deceleration error signal generating and amplitude limiting circuit means 18 in effect can be set and adjusted to limit respectively the maximum positive and negative rate of change of automatic braking pressure 78 during automatic braking. Finally, it can now be observed that aircraft deceleration overshoot command signal circuit generating means 16 operates in such a manner as to cause an initially high deceleration overshoot command signal 69 at the summing input to the aircraft deceleration error signal generating and amplitude limiting circuit means 18 when the system logic controlled switching means 12 is first actuated, and then causes the initial deceleration overshoot command signal 69 to decay with time (exponentially in this embodiment) to zero, and thereby the initial deceleration overshoot command signal 69, being added to the pilot's deceleration command signal 68 as selected by the pilot with the deceleration level selecting switch means 14, causes a net aircraft deceleration command that is initially high and then decays (exponentially) to the level selected by the pilot for the remaining operation of the automatic braking system, thereby giving the pilot a certain "feel" when automatic braking is first applied. It should be noted that the rate of application of automatic braking pressure 78 caused by this initial deceleration overshoot command signal 69 is limited to the rate as set by the deceleration error limiting circuit means 19 and 20 portions of the airplane deceleration error signal generating and amplitude limiting circuit means 18 as previously described.

Figure 9:
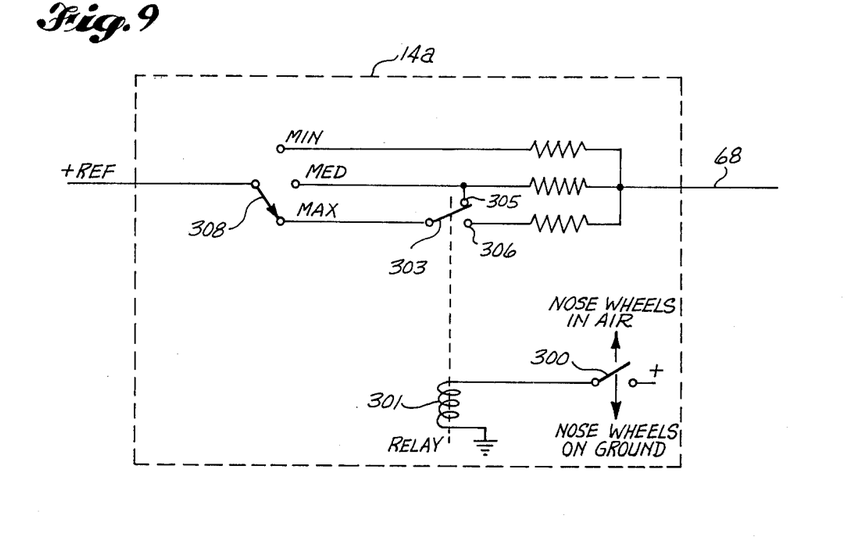

The deceleration level selecting switch means 14 of the system of FIG. 1 is shown at 14a in FIG. 9 in a configuration wherein the deceleration level selecting switch means 14a is responsive to nose wheel contact with the runway surface. The purpose of the switching circuit of 14a is to prevent hard nose gear touchdown caused by application of automatic braking prior to nose wheel touchdown. A means for detecting nose wheel contact with the runway surface such as nose gear squat switch 300 may be utilized or nose wheel contact may be detected by means responsive to rotation or spin-up of the nose wheels (not shown). When the nose wheels are not contacting the runway (in the air) detecting means 300 prevents power application to relay coil 301 thereby causing relay switch 303 to remain in a relaxed state in contact with switch contact 305. When the pilot's deceleration selecting switch 308 is set in the MAX position, relay switch 303 being relaxed at contact 305 provides a pilot's deceleration command signal 68 which is the same as if the pilot had selected the MED level of deceleration with switch 308. As a consequence, automatic braking in the system is commanded at a lower deceleration level which tends to lessen the forces which may cause the nose gear to touch down too hard. When the nose wheels contact the runway surface, detecting means 300 causes power to be applied to relay coil 301 thereby energizing relay switch 303 to switch contact 306. This causes the MAX deceleration level to be obtained by the system of FIG. 1 as soon as the nose wheels contact the runway surface.

Turning now to the hydraulic portion of the system, a simplified embodiment of which is depicted herein in FIG. 1 for illustrative purposes, hydraulic fluid is supplied to the left and right pilot's pedal operated pressure metering valve means 33 and 34, respectively, and one automatic braking control valve means 35. The left and right pilot's pedal operated pressure metering valve means 33 and 34, respectively, each in known manner generate a left and right pilot's metered braking pressure 76 and 77, respectively, which is representative of the force with which the pilot applies his left and right, respectively, pilot's brake pedal means 31 and 32. The automatic braking control valve means 35 generates an automatic braking pressure 78 in the manner previously described to regulate airplane deceleration. Also, in accordance with this hydraulic embodiment, the automatic braking control valve means 35 incorporates an hydraulic fluid restrictor means 38 in the automatic braking pressure modulating valve return line 39 which slows down the release of hydraulic fluid from the automatic braking pressure 78 through the automatic braking control valve means 35 to the hydraulic return line, thereby insuring a gradual and comfortable release of automatic braking pressure 78 when the automatic braking system is turned off. Now, noting the operation of the left hand side of the hydraulic system and observing that the right hand side operates in an identical manner with the single automatic braking pressure 78 being common to both sides, the left pilot's metered braking pressure 76 is coupled to one input port of the left shuttle valve 40 and the automatic braking pressure 78 is connected to the other input port of the left shuttled valve 40. Left shuttle valve 40 then compares the two input pressures, left pilot's metered braking pressure 76 and automatic braking pressure 78, and blocks the lower of the two input pressures while permitting the higher of the two input pressures to freely pass through the left shuttle valve 40 to become the left metered braking pressure 80. For example, during automatic braking when the left pilot's metered braking pressure 76 is lower than the automatic braking pressure 78, the left shuttle valve 40 blocks the left pilot's metered braking pressure 76 and allows the automatic braking pressure 78 to freely pass through the left shuttle valve 40 to become the left metered braking pressure 80. Then when the pilot applies sufficient left pilot's metered braking pressure 76 to exceed the automatic braking pressure 78, left shuttle valve 40 blocks the automatic braking pressure 78 and allows left pilot's metered braking pressure 76 to freely pass through left shuttle valve 40 to become left metered braking pressure 80. Left metered braking pressure 80 is then coupled to left anti-skid valve 42 which generates left brake pressue 82 as commanded by left anti-skid valve signal 88. Left brake pressure 82 is then coupled to left brake 44 which applies braking torque to left wheel 46. For illustrative purposes herein, a left anti-skid wheelspeed transducer 48 continuously generates a left "raw" wheelspeed signal 85 in known manner which is representative of the rolling speed of left wheel 46. Left "raw" wheelspeed signal 85 is then coupled to the left anti-skid control circuit 50 which, in known manner, generates a left wheelspeed signal 54 to be represenative of the rolling speed of left wheel 46 and also generates a left anti-skid valve signal 88 which is in turn coupled to the left anti-skid valve 42.

The anti-skid system comprises left anti-skid wheelspeed transducer 48, left anti-skid control circuit 50, and left anti-skid valve 42. Left anti-skid control circuit 50 continually monitors left "raw" wheelspeed signal 85 from left anti-skid wheelspeed transducer 48 to generate the left wheelspeed signal 54 and then continually monitors the left wheelspeed signal 54 to determine whether the left wheel 46 is skidding. If the left anti-skid control circuit determines that no skid activity exists, then the circuit transmits a left anti-skid valve signal 88 to the left anti-skid valve 42 causing it to freely pass the left metered braking pressure 80 through the valve and become the left brake pressure 82. If the left anti-skid control circuit 50 determines that skid activity does exist, then the circuit transmits a left anti-skid valve signal 88 to left anti-skid valve 42 causing it to reduce the left brake pressure 82 by some variable amount below the level of the left metered braking pressure 80, thereby correcting the skidding condition of left wheel 46.

During typical operation of the automatic braking system, it can be seen that when the left and right brake pressures 82 and 83 are not sufficiently high to cause wheel skids, the automatic braking pressure 78 at the output of the automatic braking control valve means 35 would pass freely through both the left and right shuttle valves 40 and 41 and the left and right anti-skid valves 42 and 43 to become the left and right brake pressures 82 and 83, respectively. Left and right brake pressures 82 and 83 exert a braking force to the left and right wheels 46 and 47 causing the aircraft to decelerate. Since the left and right wheels 46 and 47 are assumed not to be in a skid condition, the rolling speed of the wheels is substantially representative of the aircraft velocity and therefore the wheel/aircraft deceleration signal, which is generated by wheelspeed deceleration signal generating circuit means 28 to be the derivative of the average of the left and right wheelspeed signals 54 and 55, is substantially representative of the rate of aircraft deceleration. This wheel/aircraft deceleration signal 56 is then compared by the aircraft deceleration error signal generating and amplitude limiting means 18 to the sum of the pilot's deceleration command signal 68 and the initial deceleration overshoot command signal 69 to generate an aircraft deceleration erro signal 71. The aircraft deceleration error signal 71 is then integrated by deceleration error signal integrating and pressure control signal limiting circuit means 22 to generate brake pressure control signal 73 which in turn causes the brake pressure control signal power amplifier means 26 and automatic braking pressure modulating valve means 37 to generate an automatic braking pressure 78 and consequent left and right brake pressures 82 and 83, respectively, which are representative of the brake pressure control signal 73. When the aircraft deceleration error signal generating and amplitude limiting circuit means 18 detects an aircraft deceleration level, as represented by the wheel/aircraft deceleration signal 56, which is less then the commanded deceleration level, as represented by the sum of the pilot's deceleration command signal 68 and the initial deceleration overshoot command signal 69, the resulting aircraft deceleration error signal 71 causes deceleration error signal integrating and pressure control signal limiting circuit means 22 to increase the automatic braking pressure 78, and thereby left and right brake pressures 82 and 83, respectively, at a rate which is representative of the amplitude of the aircraft deceleration error signal 71, the rate being limited by deceleration error signal limiting circuit means 19, thereby causing an increase in aircraft deceleration as represented by the wheel/aircraft deceleration signal 56, and a decrease in the magnitude of the aircraft deceleration error signal 71.

When the aircraft deceleration error signal generating and amplitude limiting circuit means 18 detects an aircraft deceleration level, as represented by the wheel/aircraft deceleration signal 56, which is greater than the commanded deceleration level, as represented by the sum of the pilot's deceleration command signal 68 and the initial deceleration overshoot command signal 69, the resulting aircraft deceleration error signal 71 causes deceleration error signal integrating and pressure control signal limiting circuit means 22 to decrease the automatic braking pressure 78, and thereby the left and right brake pressures 82 and 83, respectively, at a rate which is representative of the amplitude of the aircraft deceleration error signal 71, the rate being limited by deceleration error signal limiting circuit means 20, thereby causing a decrease in aircraft deceleration, as represented by the wheel/aircraft deceleration signal 56, and a decrease in the magnitude of the aircraft deceleration error signal 71.

If wheel skidding beings to occur, left and right anti-skid control circuit means 50 and 51, respectively, cause left and right anti-skid valve means 42 and 43, respectively, to reduce left and right brake pressures 82 and 83, respectively, below the automatic braking pressure 78 and thereby prevent or correct a sudden decrease in left and right wheelspeed signals 54 and 55, respectively. This reduction of the left and right brake pressures 82 snd 83 causes the aircraft deceleration, as represented by the wheel/aricraft deceleration signal, to be reduced. The effects of any momentarily sharp decreases and increases in speed of the left and right wheels 46 and 47, respectively, as caused by anti-skid controlled skidding activity are substantially minimized by the wheelspeed averaging and deceleration filtering characteristics of the wheelspeed deceleration signal generating circuit means 28 and by the cancelling effect of the high deceleration that occurs as the wheel goes into a skid followed by the high acceleration that occurs as the wheel recovers from the skid. Therefore, even during wheel skid activity, the wheel/aircraft deceleration signal 56 is substantially representative of the actual aircraft deceleration, so, when left and right brake pressures 82 and 83, respectively, have been lowered by the anti-skid system due to skid activity, the resulting decrease in aircraft deceleration, as represented by the lower wheel/aircraft deceleration signal 56, causes automatic braking pressure 78 to increase. Since left and right anti-skid control circuit means 50 and 51, respectively, will not allow the increased automatic braking pressure 78 to cause an increase in left and right brake pressures 82 and 83, respectively, beyond the level which causes skid activity, the condition of low aircraft deceleration persists despite the increase in automatic braking pressure 78, and so the automatic braking pressure 78 continues to rise until either the aircraft deceleration reaches the commanded level or the automatic braking pressure 78 reaches the level set by the maximum brake pressure control signal limiting circuit means 23 portion of deceleration error signal integrating and pressure control signal limiting circuit means 22.

During anti-skid braking, the limits on automatic braking pressure 78 rate of change, as set by deceleration error circuit limiting means 19 and 20 portion of the airplane deceleration error signal generating and amplitude limiting circuit means 18, as previously described, prevent sudden changes in automatic braking pressure 78 which might interfere with the anti-skid system's ability to efficiently control skid activity, and therefore, the said rate limits insure that the automatic braking system will not degrade aircraft stopping ability during anti-skid controlled braking. Also, the preset limit on maximum automatic braking pressure 78, as set by maximum brake pressure control signal limiting circuit means 23 portion of the deceleration error signal integrating and pressure control signal limiting circuit means 22 in the manner previously described, prevents the automatic braking pressure 78 from reaching such a high level as to degrade the anti-skid system's ability to efficiently control skid activity, and therefore the maximum pressure limit insures that the automatic braking system will not degrade aircraft stopping ability during anti-skid controlled braking. The aforementioned maximum pressure limit would normally be preset to a high enough level to permit the automatic braking pressure 78 to reach a high enough level to cause the commanded deceleration level to the achieved during conditions where no anti-skid activity exists.

Finally, when the automatic braking system is disengaged by the pilot, normally by the application of the left and right pilot's brake pedal means 31 and 32, respectively, a logic signal, typically the pilot's brake pedal application signal 61, is transmitted to the system logic control circuit means 13 which in turn de-energizes the system logic controlled switching means 12 and thereby decouples the brake application enabling power 65 and the deceleration control circuit enabling signal 66. By removing the deceleration control circuit enabling signal 66, minimum brake pressure control signal limiting circuit means 24 portion of the deceleration error signal integrating and pressure control signal limiting circuit means 22 reduces brake pressure control signal 73 so that the automatic braking pressure 74 is commanded to a release condition, and also the initial aircraft deceleration overshoot command signal circuit generating means 16 is "reset" to again command an initial deceleration overshoot command signal 69 when the next deceleration control circuit enabling signal 66 is generated. By removing the brake application enabling power 65, the hydraulic power shutoff valve means 36 portion of the automatic braking control valve means 35 is de-energized which causes the valve means to remove hydraulic power from the automatic braking pressure modulating valve means 37 portion of the automatic braking control valve means 35, and also brake pressure control signal power amplifier means 26 is de-energized which in turn removes the automatic braking pressure regulating power 74 which causes automatic braking pressure modulating valve means 37 to couple the automatic braking pressure 78 to the automatic braking pressure modulating valve return line 39.

When the automatic braking pressure 78 is coupled to the automatic braking pressure modulating valve return line 39, the hydraulic fluid restrictor means 38 causes the automatic braking pressure 78 to release at a rate which causes a smooth but noticeable automatic braking pressure 78 release. Also, as previously described, whenever the automatic braking pressure drops below the left and right pilot's metered braking pressures 76 and 77, respectively, left and right shuttle valve means 40 and 41, respectively, act to block the automatic braking pressure 78 and couple the left and right pilot's metered braking pressures 76 and 77 to the left and right metered braking pressures 80 and 81, respectively, thereby placing the entire braking system under normal pilot control.

Figure 2:
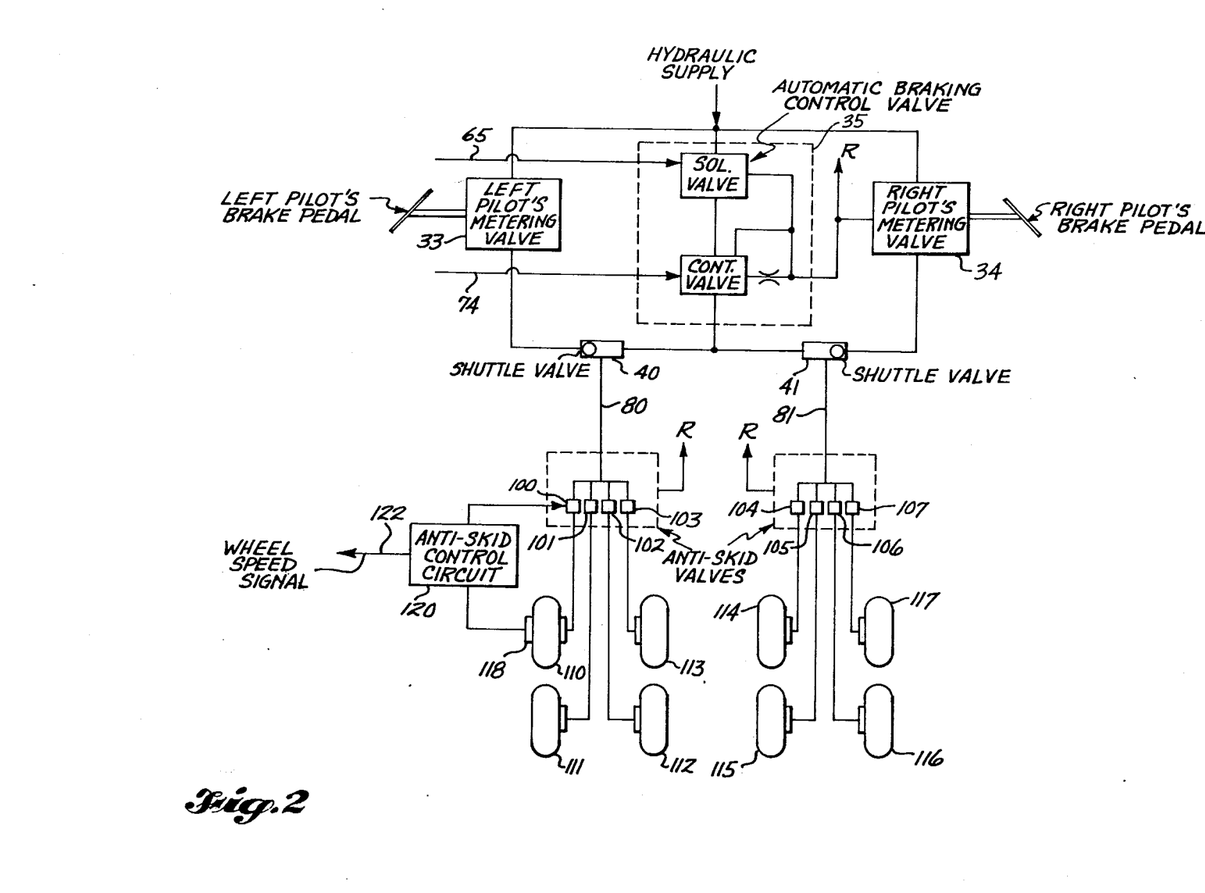
FIG. 2 is a further embodiment of a hyraulic portion useful in the system of FIG. 1 for coupling to the brake pressure control signals developed therein instead of the hydraulic portion shown in FIG. 1.
Figure 3:
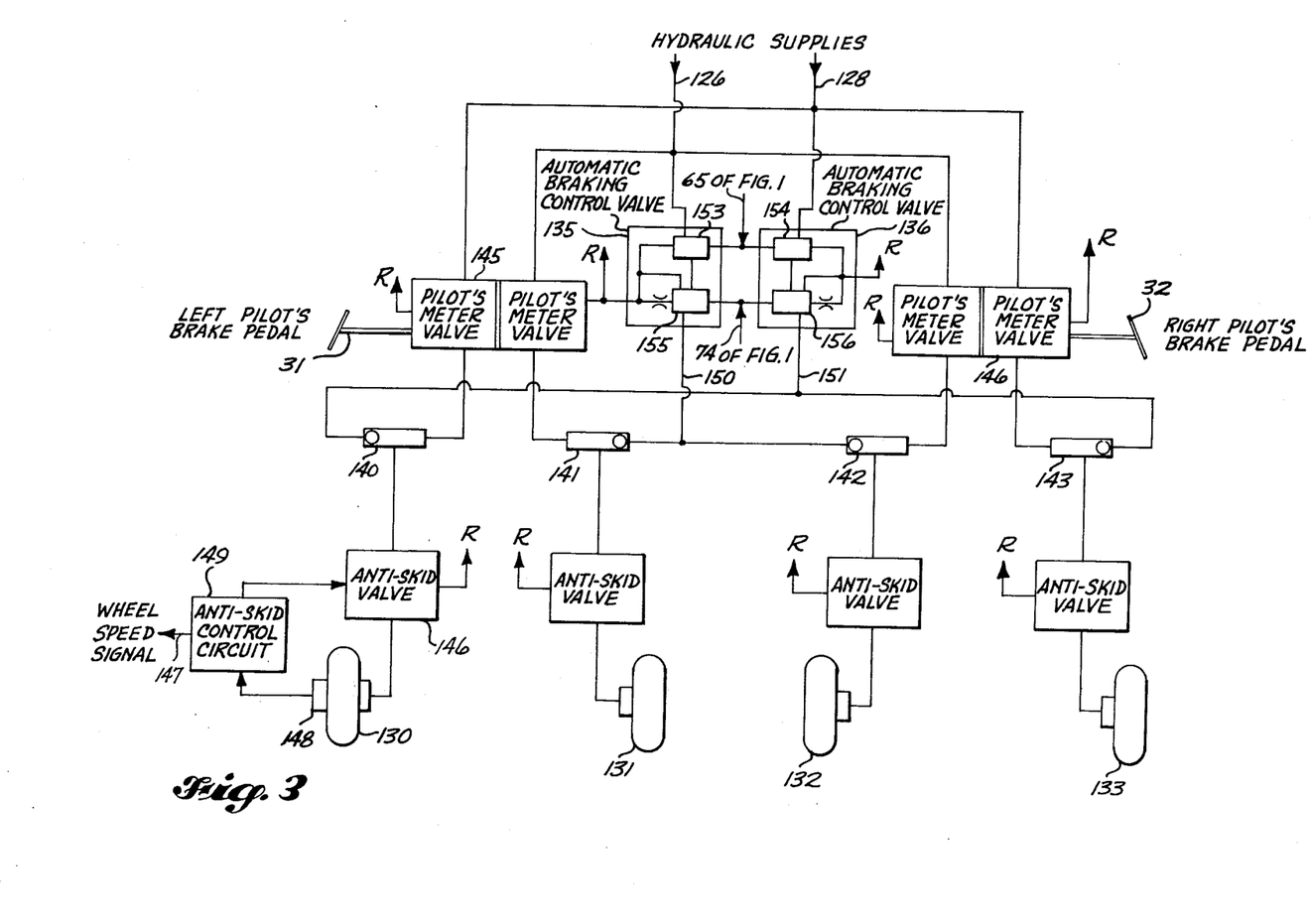
FIG. 3 is illustrative of another hydraulic system which may be coupled to the amplified pressure control signals developed in the control channel of FIG. 1.
Figure 4:
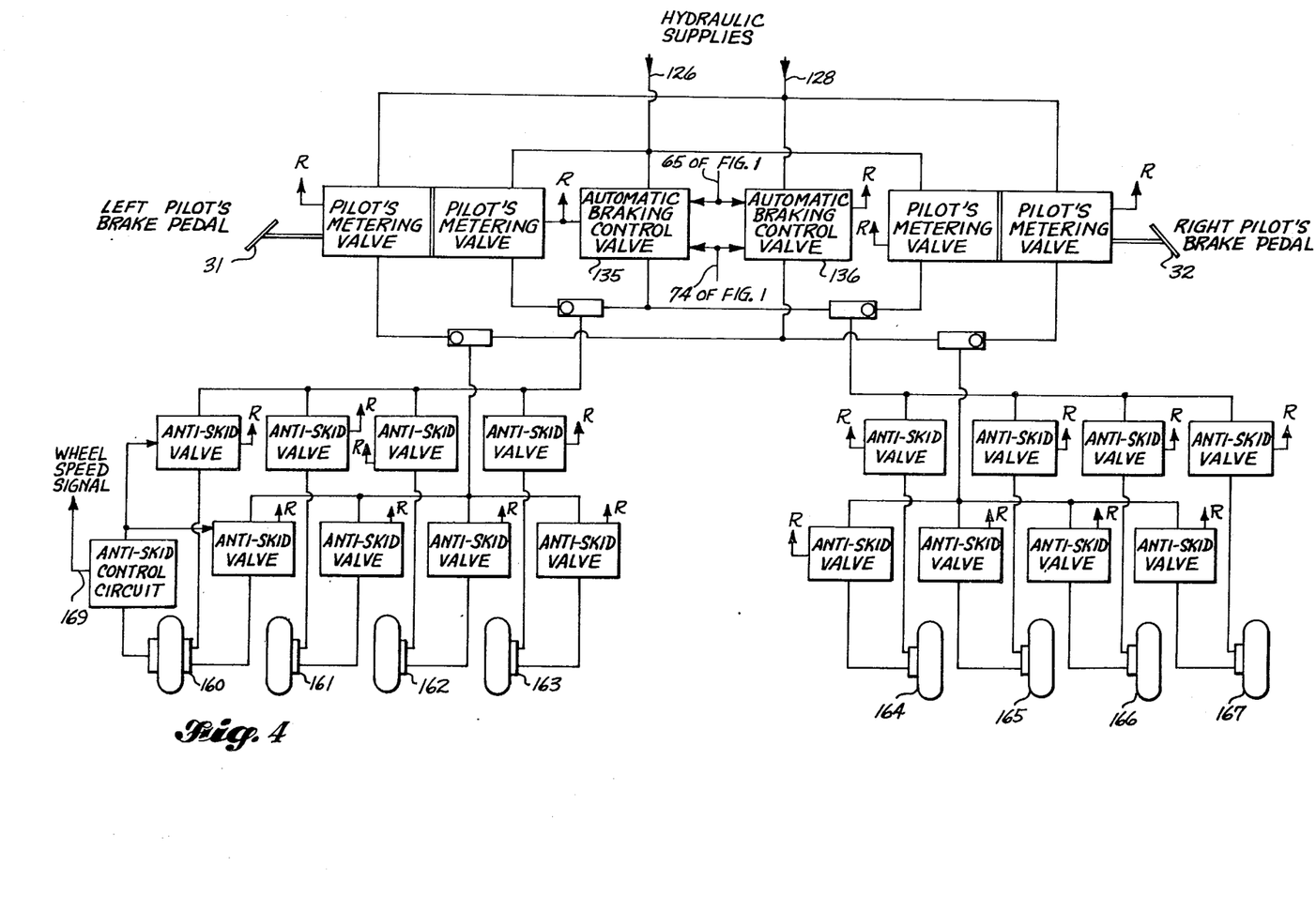
FIG. 4 is illustrative of yet a further hydraulic system which may be coupled to the amplified pressure control signals developed in the control channel of FIG. 1.

The following description relates to FIGS. 2, 3, and 4, wherein there are schematically depicted three embodiments of the hydraulic portion of the automatic braking system of FIG. 1 useful in three different aircraft hydraulic braking system configurations. FIG. 2 shows the automatic braking system hydraulic components coupled to an aircraft hydraulic braking system having a plurality of braked wheels 100 through 107, all being serviced by a single hydraulic supply. This embodiment operates in a manner similar to the embodiment of FIG. 1 except that left and right shuttle valve means 40 and 41 provide left and right metered braking pressures 80 and 81, respectively, to a plurality of left and right anti-skid valve means 100, 101, 102, and 103, and 104, 105, 106, and 107, respectively, instead of the single left and right anti-skid valve means 42 and 43, respectively, of FIG. 1. Braked wheel 110 now described is typical of the operation of the other braked wheels 111 through 117 in being provided with an anti-skid wheel-speed transducer means 118, and anti-skid control circuit means 120, and an anti-skid control valve means 100 which are coupled together and operate in the manner previously described in connection with the system of FIG. 1 to provide skid protection to braked wheel 110 and to generate a wheelspeed signal 122 which is representative of the rotary speed of braked wheel 110, so that there is a single wheelspeed signal that is generated by each braked wheel to be representative of the rotary speed of that respective braked wheel. Any number and combination of wheelspeed signals are then coupled to the wheelspeed deceleration signal generating circuit means 28 of FIG. 1 which generates a wheel/aircraft deceleration signal 56 representative of the average deceleration of that number and combination of wheelspeed signals, and the same or different number and combination of wheelspeed signals are then coupled to wheelspeed spin-up detector circuit means 29 of FIG. 1 which generates a wheelspeed spin-up signal 57 when the average of said same or different number and combination of wheelspeed signals exceeds the preset spin-in threshold.

Figures 5, 7:
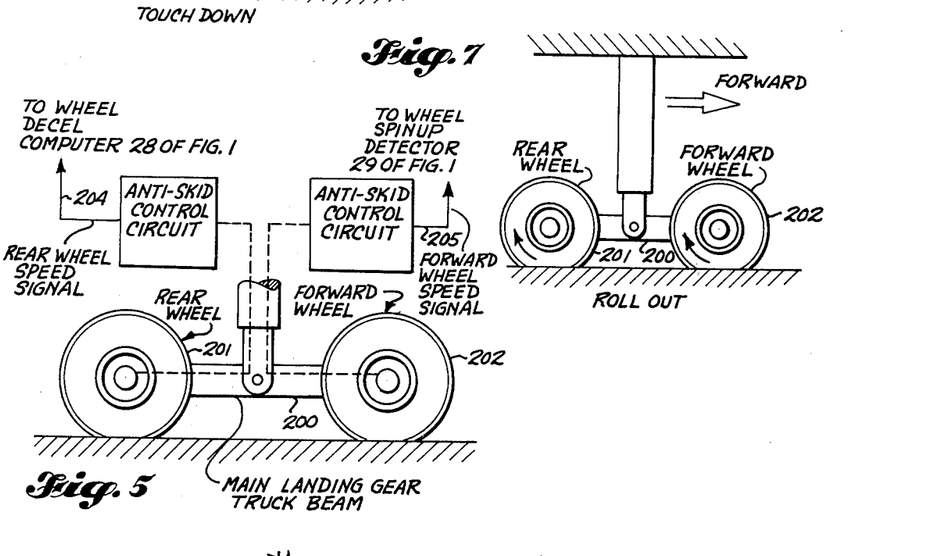
FIG. 5 is illustrative of side view of a landing gear truck arrangement useful for coupling to wheelspeed deceleration signal generating circuit means and wheelspeed spin-up detector circuit means of the system of FIG. 1 to provide these information signals useful in signal processing in the system of FIG. 1.
FIG. 7 is also illustrative of a side view of the truck of FIG. 6 at a subsequent time during the landing sequence when the rear and forward wheels of the truck are in contact with the runway surface.
Figure 6:
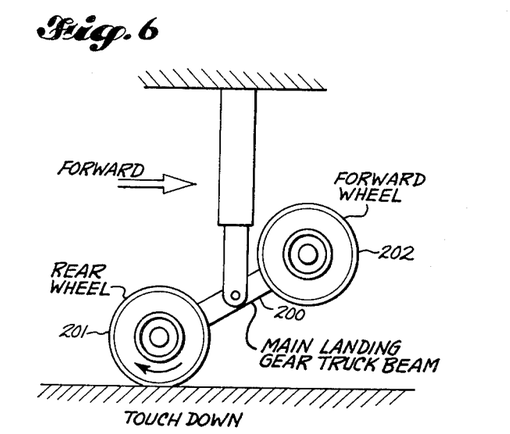
FIG. 6 is illustrative of a side view of a multiple wheeled main landing gear truck at the instant of touchdown of the aircraft.
Figure 8:
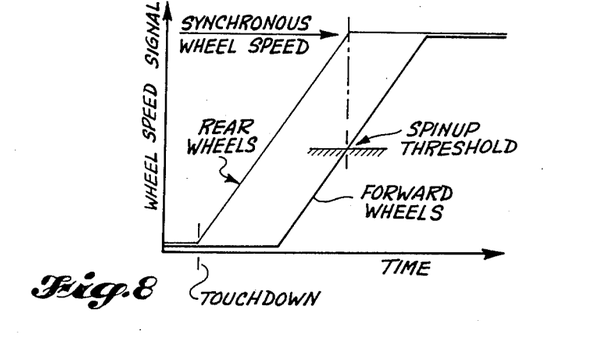
FIG. 8 is a graph of wheelspeed information signals versus time of the front and rear wheels of the landing gear truck during the period subsequent to touchdown helpful in understanding how deceleration controlled braking is provided in automatic braking systems such as shown in FIG. 1; and, FIG. 9 shows a further deceleration level selecting means for utilization in the system of FIG. 1.

Now, for example, FIG. 5 shows a main landing gear configuration where it is advantageous to couple all the wheelspeed signals typical of 204 from the rear wheels typical of 201 on each main landing gear truck beam typical of 200 to wheelspeed deceleration signal generating circuit means 28 of FIG. 1 so that the circuit generates a wheel/aircraft deceleration signal 56 which is representative of the average deceleration of the rear wheels on all the main landing gear truck beams typical of 200 and further to couple all the wheelspeed signals typical of 205 from the forward wheels typical of 202 on each main landing gear truck beam typical of 200 to the wheelspeed spin-up detector circuit means 28 of FIG. 1 so that the circuit generates a wheelspeed spin-up signal 57 when the average speed of the forward wheels on all the main landing gear truck beams exceeds the preset spin-up threshold. By way of this embodiment, FIG. 6 shows a side view of a multiple wheeled main landing gear at the instant of aircraft touchdown, and shows that the main landing truck beam 200 is biased to tilt upward in flight so that the rear wheels typical of 201 contact the runway at touchdown prior to the forward wheels typical of 202. FIG. 7 shows the same main landing gear a moment later when the aircraft has touched down firmly and both the rear and forward wheels 201 and 202, respectively, have contacted the runway. FIG. 8 is an illustrative plot of wheelspeed signal versus time for the rear the forward wheels typical of 201 and 202, respectively, showing that due to the rear wheels contacting the runway prior to the forward wheels, the rear wheels spin up to a speed synchronous with the aircraft velocity prior to the forward wheels. By coupling the forward and rear wheelspeed signals typical of 205 and 204, respectively of FIG. 5 to the wheelspeed spin-up detector circuit means 29 and the wheelspeed deceleration signal generating circuit means 28, respectively, of FIG. 1, a wheelspeed spin-up signal 57 is not generated to cause the system to begin to apply deceleration controlled braking until the rear wheelspeeds have achieved or nearly achieved a speed synchronous with the velocity of the aircraft, thereby minimizing or eliminating the momentary error in the wheel/aircraft deceleration signal 57 of FIG. 1 caused by initial wheel spin-up. Another advantage of present coupling of the forward and rear wheelspeed signals 205 and 204, respectively, to the wheelspeed spin-up detector circuit means 29 and the wheelspeed deceleration signal generating circuit means 28, respectively, of FIG. 1, as shown in FIG. 5, as that it is desirable that most or all of the braked wheels be partly or completely spun up before brake pressure is applied so that the anti-skid system can adequately provide skid protection, since if brakes were applied prior to wheel spin-up, and if brake pressure where sufficient to cause a wheel skid or prevent spin-up, and if no other means were provided to the anti-skid system to know that a locked wheel condition existed, then blown tires would result.

Turning now to FIG. 3, the automatic braking system hydraulic components are shown coupled to an aircraft hydraulic braking system having a plurality of braked wheels 130 through 133, an equal number of each being serviced by only one of two hydraulic supplies 126 or 128. This embodiment operates in a similar manner as the embodiment of FIG. 1 except that there are two complete brake hydraulic systems including two automatic braking control valve means 135 and 136 and four shuttle valve means 140 through 143 and the left and right pilot's brake pedal means 31 and 32, respectively, each operate a pair of left and right pilot's pedal operated pressure metering valve means 145 and 146, respectively. Braked wheel 130 is shown as typical of the other braked wheels, 131, 132, and 133 in being provided with an anti-skid wheelspeed transducer means 148, an anti-skid control circuit means 149, and an anti-skid control valve means 146, which are coupled together and operate in known manner as previously described to provide skid protection to braked wheel 130 and to generate a wheelspeed signal 147 which is representative of the rotary speed of braked wheel 130, so that there is a single wheelspeed signal that is generated by each braked wheel to be representative of the rotary speed of that respective braked wheel. Any number and combination of wheelspeed signals are then coupled to the wheelspeed deceleration signal generating circuit means 28 and wheelspeed spin-up detector circuit means 29 of FIG. 1 as previously described. The two automatic braking control valve means 135 and 136 are coupled to the automatic braking system electrical system of FIG. 1 in such a manner that both automatic braking control valve means 135 and 136 operate substantially identically and simultaneously with each other to generate equal automatic brake pressures 150 and 151 at all times. For example, the brake application enabling power 65 of FIG. 1 could be coupled in parallel to both hydraulic power shutoff valve means 153 and 154 of FIG. 3 and the automatic braking pressure regulating power 74 of FIG. 1 could be coupled in series to both automatic braking pressure modulating valve means 155 and 156, and thereby cause the brake application enabling power 65 of FIG. 1 to open both hydraulic power shutoff valve means 153 and 154 of FIG. 3 simultaneously and cause the automatic braking pressure regulating power 74 of FIG. 1 to command both automatic braking pressure modulating valve means 155 and 156 of FIG. 3 to simultaneously regulate the automatic braking pressures 150 and 151, respectively, to be substantially equal at all times and representative of the automatic braking pressure regulating power.

Turning now to FIG. 4, the automatic braking system hydraulic components are shown coupled to an aircraft hydraulic braking system having a plurality of braked wheels 160 through 167 each being serviced by both of two hydraulic supplies 126 and 128. This embodiment operates in a similar manner to the embodiment of FIG. 3 except that each braked wheel 160 through 167 contains a brake which is actuated by either or both of two separate brake pressures so that each braked wheel is serviced by a brake pressure from each hydraulic supply. As in FIG. 2 and 3, a typical anti-skid control circuit is shown for a braked wheel which is coupled to provide skid protection for the braked wheel and further provides a wheelspeed signal 169 which is representative of the rotary speed of braked wheel 160. The wheelspeed signals typical of 169 are coupled to the electrical control system of FIG. 1 as explained in connection with FIG. 2. The electrical control system to FIG. 1 is coupled to the two automatic braking control valve means 135 and 136 as explained earlier in connection with the description of FIG. 4.

I claim:

1. In combination in an aircraft having an automatic braking system and nose wheels:
    pilot selectable switching means for commanding a level of deceleration upon landing of the aircraft;
    second means for detecting aircraft nose wheel contact with a runway surface; and,
    third means responsive to said second means for commanding a level of deceleration less than the level selected by said pilot selectable switching means when the aircraft nose wheels are not in contact with the runway surface and providing said pilot commanded level of deceleration when the aircraft nose wheels are in contact with the runway surface.

2. The invention according to claim 1 wherein said third means provides said deceleration level less than the commanded level selected by said pilot selectable switching means when the highest command level provided by said pilot selectable switching means is selected.

3. The invention according to claim 1 wherein said level of deceleration less than the level selected by said pilot selectable switching means is a lesser selectable command level selectable by said pilot selectable switching means than the selected command level.

* * * * *